United States Patent [19]

Douglass

[11] Patent Number: 4,632,446

[45] Date of Patent: Dec. 30, 1986

[54] LOCKING DEVICE FOR A PICKUP STORAGE BOX DOOR

[76] Inventor: Clinton C. Douglass, 908 San Carlos St., Bakersfield, Calif. 93308

[21] Appl. No.: 720,446

[22] Filed: Apr. 5, 1985

[51] Int. Cl.⁴ .......................... B60R 5/00; H02K 1/00

[52] U.S. Cl. .................................. 296/37.6; 312/216; 292/205

[58] Field of Search ............... 296/37.6; 312/216, 333; 292/205, 218, 259; 20/78, 85, 94

[56] References Cited

U.S. PATENT DOCUMENTS 3,245,713 4/1966 Ogilvie .............................. 296/37.6

3,988,031 10/1976 Meyer ................................ 292/205

4,067,444 1/1978 Wilson ................................ 312/216

*Primary Examiner*—Francis K. Zugel

*Assistant Examiner*—J. Falk

*Attorney, Agent, or Firm*—Lothrop & West

[57] ABSTRACT

To prevent opening movement of a door hinged to the side panel of a pickup storage box, a longitudinally extending bar is mounted on levers pivoted to mountings secured to the storage box to move between a lower position overlying and obstructing the door and an upper position out of the way of the door and extending above the storage box. A releasable locking means holds the bar in either the lower position or the upper position.

2 Claims, 5 Drawing Figures

LOCKING DEVICE FOR A PICKUP STORAGE BOX DOOR

BRIEF SUMMARY OF THE INVENTION

For use on a pickup truck body having a storage box with longitudinal top and side panels and provided with a door in the side panel hinged to swing outwardly about an axis, there are mountings spaced apart longitudinally on the top panel. The mountings pivotally carry levers joined by a bar arranged to lower into the opening path of the door and to lift out of that path to a position well above the top panel. At least one mounting and lever are arranged with a locking device to prevent both lowering and lifting movement of the bar.

PRIOR ART

No. Des. 132,712: Troche et al.
No. Des. 134,573: Glascock, Jr. et al.
No. Des. 143,990: Powers
No. Des. 143,993: Powers
201,209: Trenholm
3,002,800: McMahan
3,189,392: Mehlig, Jr. et al.

While these patents were found in a comprehensive search, none discloses any structure or operation as claimed herein.

DETAILED DESCRIPTION

Figure 1:
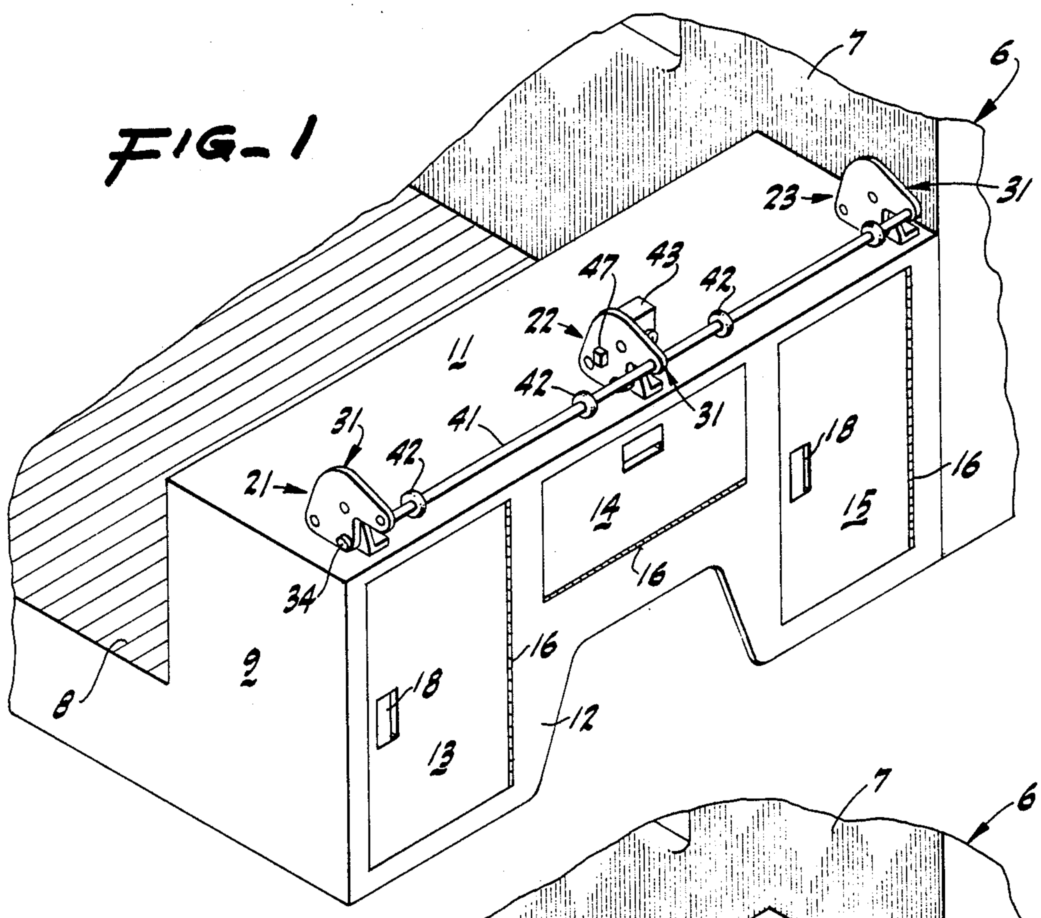
FIG. 1 is an isometric perspective with portions broken away showing the structure as installed on a pickup truck, the lock bar being in upper or released position.
Figure 2:
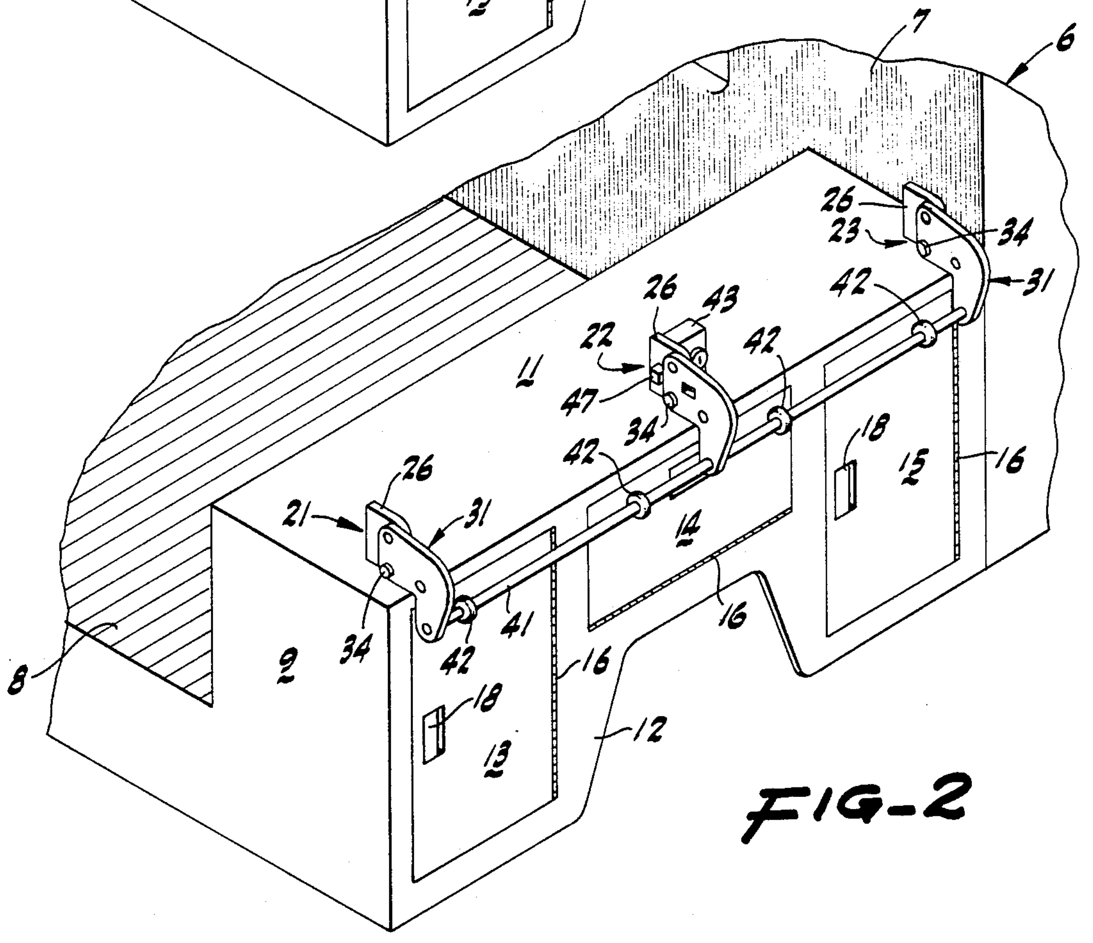
FIG. 2 is a view similar to FIG. 1 but showing the lock bar in a lower or locking position.

Many pickup trucks 6 have a cab 7 and a generally horizontal, planar bed 8 carried by a chassis and wheels (not shown) and provided, usually at each side and extending longitudinally, with an especially made storage box 9 for carrying various auxiliary equipment. The storage box 9 is conveniently fabricated of metal panelling, including a planar top panel 11 and a planar side panel 12. The side panel has any number of various openings, each of which is normally closed by doors 13, 14 and 15, for example. Each door is mounted by an appropriate piano hinge 16 and has a hand-operated latch or lock 18 customarily provided with some sort of key or other security device.

It often occurs that the pickup truck is parked either at a job or at some remote location and is available for plundering and pilfering of the contents of the various cabinets. While the locks usually available are of some use, it is sometimes the case that the user, needing to gain access with considerable frequency, does not always make sure that the locks are effective.

Also, when the vehicle is advancing on the roadway, the doors 13, 14 and 15 are in the windstream. Unless they are then securely closed, it is possible that they can be swung open either due to the wind or due to vibrations or body lurching or if the locks are not snapped closed securely, thereby permitting contents of the cabinets to fall out, not only occasioning loss, but also leaving items dangerously in the roadway.

Additionally, there are some times when relatively bulky high loads are disposed on the bed 8 and extend above the top panels 11 of the boxes. There is often not a very good way to secure such loads temporarily in position against shifting and dislodgment.

I have therefore provided a particular arrangement for obviating the foregoing and other difficulties. While the pickup truck usually has a storage box 9 at either side, these boxes are substantially duplicates, so that a description of one is intended to apply to the other as well.

At spaced longitudinal intervals on the top panel 11 of the storage box there are individually installed a number of mountings 21, 22 and 23. These are all substantially alike and include an upright plate 26 appropriately secured; for example, by welding, to the panel 11. If desired, the plate 26 is provided with a flange 27 so that additional area and margin are available for fastening the mounting firmly to the storage box top 11.

Figure 5:
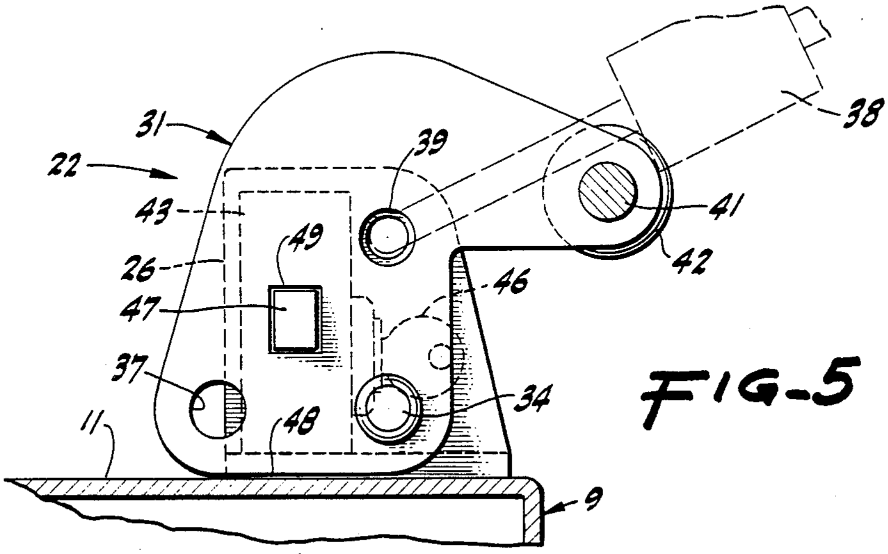
FIG. 5 is a view similar to FIG. 3 but showing the lever and bar in upper position.
Figure 4:
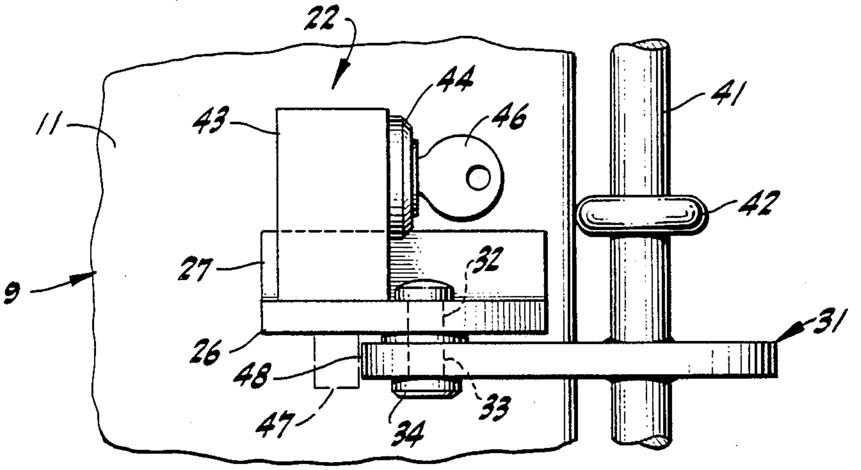
FIG. 4 is a plan of the structure disclosed in FIG. 3, portions being broken away.
Figure 3:
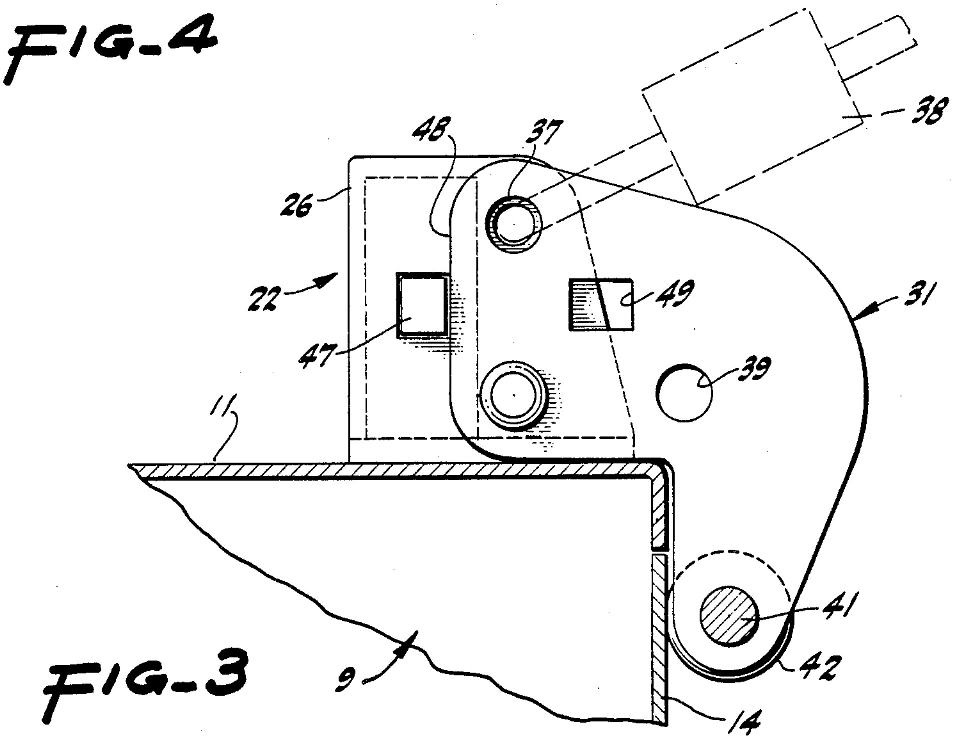
FIG. 3 is a side elevation to an enlarged scale of one of the mounting and lever units in a locking position.

Designed to cooperate with a respective mounting is a corresponding one of several specially contoured levers 31. Each lever is conveniently of similar material to the mounting 22 and, with its mounting, is provided with appropriate perforations 32 and 33 to receive a through rivet 34 or pivot pin so that the lever 31 can swing between a position as shown in FIG. 3 and a position as shown in FIG. 5. The lever 31 also has a perforation 37 designed in one position of the lever to register with a similar perforation in the mounting 22, so that a padlock 38, for example, can have its hasp introduced through the aligned openings 37 and thus secure the mounting and the lever against relative pivotal movement about the pin 34.

Also, the lever is preferably provided with a perforation 39 in an appropriate location so that when the lever has been moved from its FIG. 3 position to its FIG. 5 position (the padlock 38 being absent) the aperture 39 will also register with the aperture in the mounting 22 and the padlock 38 can again be inserted through the aligned openings, thus locking the lever 31 in its uppermost or raised position with respect to the mounting.

To make the lever 31 more generally effective as a barrier, since the lever itself does not usually extend over very much of the face of the storage box and not necessarily over all of the doors 13, 14 and 15, the lever is also pierced to afford a mounting for a bar 41. This can be either a solid rod or a substantial pipe passing through comparable apertures in each one of the several levers. The bar 41 preferably is welded to each lever. The bar 41 at appropriate intervals carries resilient washers 42 so that in its lower position the lever itself does not come directly against the material of the body. Rather, the resilient washers 42 make the contact to avoid damaging the surface of the body material and in order to have a slightly resilient or yielding fit.

Under some circumstances, it is preferred to have in addition to or as an alternative to the use of the padlock 38 a built-in locking device. While various or all of the mountings and levers can be so provided, it is deemed adequate to equip the centermost mounting 22 with a key locking mechanism. In this instance, the mounting 22 carries a housing 43, preferably integral therewith or welded thereto. The housing itself carries the operating structure 44 of a pin tumbler, rotary lock actuated by a removable key 46 in the customary fashion. When the key is rotated in one direction, there is projected from the lock body 43 a lock bolt 47 which lies immediately behind or against one face 48 or edge of the lever 31. In this position of the projected lock bolt, the lever 31 cannot be moved counterclockwise, in FIG. 3, and cannot be moved clockwise because of the abutment of the washer 42 with the side of the body. Thus, all levers and the bar 41 are locked throughout the bar length in the lowermost position.

When the key 46 is operated to retract the bolt 47, then the adjacent lever 31 and all of the levers, because they are connected by the bar 41, are rotatable counterclockwise until the face 48 is or all faces are in close abutment with the top panel 11. In that position of the central lever, at least, another aperture 49 therein is in the path of the lock bolt 47. Similarly, when the key 46 is operated, the lock bolt 47 is projected, but this time passes through the aperture 49. In that way the central lever and all of the connected mechanism is locked against motion. The rod 41, locked in an uppermost position out of any path of movement of the doors 13, 14 and 15, is held stationarily, as shown in FIG. 5, and is then available as a lashing or tie-down bar. Articles on the bed 8 of the truck can be tied with ropes, cables and the like, which themselves can be anchored to the bar 41 in its uppermost position. In this position, the lock bolt 47 holds the members steady.

When the key 46 is turned to its other position, the latch bolt 47 is again retracted and the lever 31 and its companions and the bar 41 are all free to rotate about the rivets 34 and may go back to their original lowered position.

In the lowered position, it is to be noted that even though the locks 18 have not been appropriately secured, none of the doors 13, 14 or 15 can come loose and swing in an outward path about their hinges 16 and cannot then spill any of their contents and cannot easily be opened. Thus, by a simple movement, when he is through with a particular job, the user after shutting the doors 13, 14 and 15 at least reasonably well can lower the bar 41 from its uppermost to its lowermost position and can turn the key 46 in order to lock the entire contents of the storage box 9 against pilferage and theft.

I claim:

1. For use with a pickup truck body having a storage box with a top panel and with a side panel carrying a door adapted to swing outwardly in a predetermined path, a combination comprising:

a. a mounting adapted to be secured to said top panel;
b. a lever;
c. a bar secured to said lever;
d. and means for pivoting said lever on said mounting for turning movement between a first position with said lever and bar in said path of said swing and a second position with said lever and said bar out of said path;

one of said mounting and said lever including a single aperture, the other of said mounting and said lever including two apertures, and means adapted to pass through said single aperture and either one of said two apertures for holding said lever against pivoting relative to said mounting; said holding means passing through said single aperture and one of said two apertures in said first position and passing through said single aperture and the other of said two apertures in said second position.

2. For use with a pickup truck body having a load bed and a storage box along at least one side thereof, said storage box including a top panel and a side panel carrying at least one door adapted to swing outwardly in a predetermined path away from said bed and box, the combination comprising:

mounting means secured to said top panel of said storage box and including at least one support lever arm;

a longitudinally extending bar secured to at least one said lever arm;

means for pivoting said lever arm and said bar on said mounting for rotative movement between a lower storage box locking position with said lever and said bar in said path of said swing and an upper lashing position with said lever and said bar out of said path;

lock means for selectively holding said lever and said bar in said storage box locking lower position or said upper lashing position respectively whereby said bar may be selectively employed to lock said storage box doors or provide tie-down rail means to secure goods on said load bed against movement thereon, one of said mounting means and said lever arm including a single aperture, the other of said mounting means and said lever arm including two apertures;

and means adapted to pass through said single aperture and either one of said two apertures for holding said lever against pivoting relative to said mounting; said holding means passing through said single aperture and one of said two apertures in said first position and passing through said single aperture and the other of said two apertures in said second position.

* * * * *